Sept. 5, 1933.  F. J. HOYER  1,925,962
CONDIMENT HOLDER
Filed Oct. 12, 1932
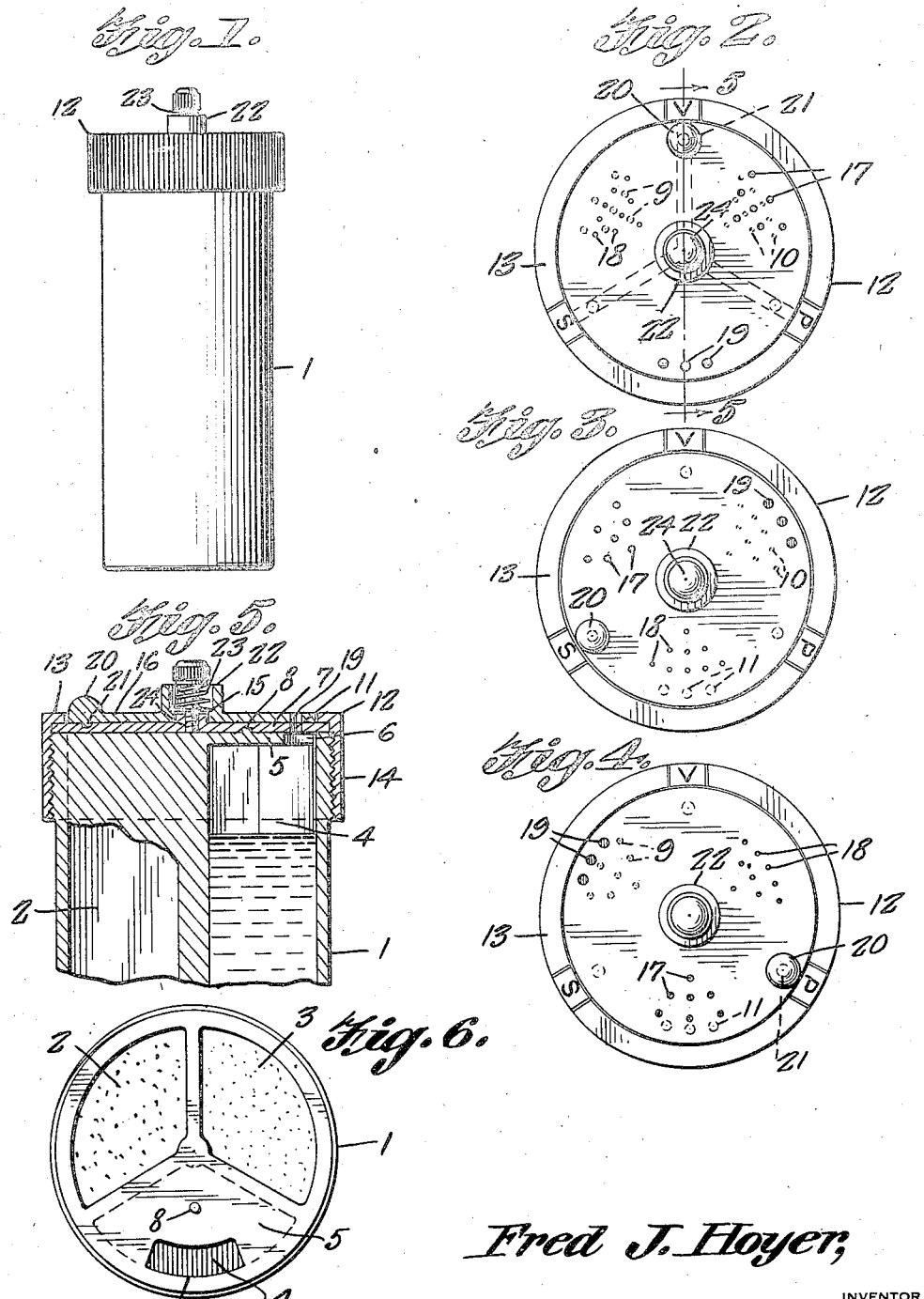
Fred J. Hoyer,
INVENTOR
BY Victor J. Evans & Co.
ATTORNEY Patented Sept. 5, 1933

1,925,962

UNITED STATES PATENT OFFICE 1,925,962

CONDIMENT HOLDER

Frederic J. Hoyer, Pittsburgh, Pa., assignor of one-half to Charles C. Wendell, Pittsburgh, Pa.

Application October 12, 1932. Serial No. 637,502

2 Claims. (Cl. 65—45)

This invention relates to condiment holders and its general object is to provide a holder that includes a plurality of compartments for receiving various kinds of condiments, one kind in each compartment, and the holder includes means whereby any one condiment can be dispensed therefrom at a time, as well as means to indicate the condiment desired to be dispensed, and means to hold the dispensing means fixed during the dispensing operation, so as to assure a free flow of one condiment at a time.

Another object of the invention is to provide a condiment holder of the character set forth, that is simple in construction, easy to use, inexpensive to manufacture, and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a view showing my condiment holder in elevation.

Figure 2 is a top plan view illustrating the dispensing means arranged for dispensing vinegar.

Figure 3 is a similar view with the dispensing means arranged for dispensing salt.

Figure 4 is a similar view with the dispensing means arranged for dispensing pepper.

Figure 5 is a sectional view taken approximately on line 5—5 of Figure 2.

Figure 6 is a top plan view of the container.

Referring to the drawing in detail, the reference numeral 1 indicates a container which as shown is cylindrical in form and is provided with an open top. Disposed within the container is a plurality of partitions that radiate from the center thereof to provide compartments, there being three compartments in the form as shown, indicated respectively by the reference numerals 2, 3 and 4. The compartment 2 in the form as shown is adapted to receive salt, the compartment 3 is to receive pepper and the compartment 4 vinegar. However, I want it understood that the condiment holder can be utilized for dispensing any kind of condiments without departing from the spirit of the invention.

The compartments 2 and 3 are provided with open upper ends, while the compartment 4 which in the present case is to receive vinegar is partially closed by a shield 5 that is provided with a slot 6 arranged adjacent the periphery of the holder as best shown in Figure 6.

Resting upon the top of the container 1 is a disk 7 that is provided with a bore on its underside to receive a stud 8 which is formed on the shield 5 and prevents rotation of the disk as will be apparent. The disk closes the upper end of the container 1 and is provided with a plurality of openings arranged in groups indicated respectively by the reference numerals 9, 10 and 11. The openings of the group 9 are relatively large and are arranged over the compartment 2, and the openings of the group 10 are arranged over the compartment 3, while the openings of the group 11 are larger than the first mentioned group and are arranged over the compartment 4. However, the openings of the group 11 are considerably less in number than the openings of the remaining groups, and I have shown only three openings in the group 11.

Cooperating with the stud 8 for fixedly associating the disk 7 to the top of the container is a cap 12 that is provided with an open top, but has an inturned flange 13 for engagement with the disk 7 as well as a downturned interiorly threaded flange 14 that acts to threadedly secure the cap to the container as best shown in Figure 5. The disk has formed thereon and rising centrally therefrom a boss 15 that is provided with a threaded bore which extends through the disk.

Mounted for rotation on the disk 7 is a relatively small disk 16 that is likewise provided with openings arranged in groups 17, 18 and 19. The group 17 is adapted to be disposed for registration with the group 9 for dispensing salt from the compartment 2, and the group 18 is adapted to be disposed in registration with the group 10 for dispensing pepper from the compartment 3, while the group 19 is adapted to be arranged in registration with the group 11 for dispensing vinegar from the compartment 4. The groups 17, 18 and 19 correspond in size to the respective groups 9, 10 and 11, and it will be noted that the groups 11 and 19 are disposed adjacent the periphery of the disks 7 and 16, so as to be disposed in registration with the slot 6.

The disk 16 has formed on its upper surface a knob 20 that is arranged adjacent the periphery of the disk 16 and acts in the capacity as a handle for rotating the disk for arranging the relative or companion groups of openings in registration with each other, and when a companion group is arranged in registration, it will be apparent that the other groups are arranged out of registration so that only one condiment is dispensed at a time.

The flange 13 has disposed thereon in any well known manner in the form as shown, the letters "S", "P" and "V", it being obvious that the letter "S" indicates salt, the letter "P" pepper and the letter "V" vinegar, and these respective letters are arranged for cooperation with the knob 20 so as to indicate the position of registration of the companion groups of openings, and when the knob 20 is disposed in alignment with the letter "V", as shown in Figure 2, the group of openings 19 is disposed in registration with the group of openings 11. When the knob is aligned with the letter "S" as shown in Figure 3, the group of openings 17 is arranged in registration with the group of openings 9, and when the knob is aligned with the letter "P" as shown in Figure 4, the group of openings 18 is arranged in registration with the group of openings 10. In order to fixedly associate or to hold the companion groups of openings in registration until manually moved out of registration, I provide indentations in the upper surface of the disk 7, and a teat 21 formed on the under surface of the disk 16 to be received in any one of the indentations and it will be obvious that when the teat is received in an indentation, one of the groups of openings is disposed in registration. Formed on and rising centrally from the disk 16 is a collar 22 that is adapted to provide a housing for a coil spring 23, the latter surrounding a screw bolt 24 that is threadedly secured in the threaded bore of the boss 15 as clearly shown in Figure 5. The coil spring 23 is provided with a relatively large lower convolution for engagement with a shoulder disposed within the collar 22, with the result the disk 16 is spring pressed so as to allow the teat 21 to be moved out of its indentation, and the spring likewise secures the disk 16 rotatably associated with the disk 7. The crew bolt is provided with a serrated head so that the tension of the spring can be varied as will be apparent.

From the above description and disclosure of the drawing, it will be obvious that I have provided a condiment holder capable of receiving a number of different kinds of condiments, with means for dispensing any one of said condiments at a time, in accordance with the desires of the user.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A condiment holder comprising a container, partitions arranged in said container and dividing the same into compartments, a shield disposed over one of said compartments and being provided with a slot, a disk secured to the top of said container and being provided with openings arranged in groups there being one group for each compartment, and one of said groups being disposed for registration with the slot, a cap for securing the disk to the container, a disk mounted for rotation on the disk first mentioned and being provided with openings arranged in groups cooperating with the groups of the first mentioned disk in a manner whereby companion groups of the disks can be arranged in registration, letters on the cap to indicate the condiments, a knob on the second mentioned disk to rotate the same and cooperating with the letters to indicate when companion groups are disposed in registration, and means to hold the second mentioned disk against casual rotation with companion groups in registration.

2. A condiment holder comprising a container, partitions arranged in said container and dividing the same into compartments, a cap threadedly secured to the top of said container and having an open top, a flange formed with said cap, a disk secured to the top of said container and held thereon by said flange, means cooperating with the flange to prevent rotation of the disk, said disk being provided with openings arranged in groups, there being one group for each compartment, a boss rising centrally from said disk, a disk mounted for rotation on the first mentioned disk and about the boss, spring means for securing the second mentioned disk in engagement with the first mentioned disk, said second mentioned disk being provided with openings arranged in groups cooperating with the groups of openings in the first mentioned disk in a manner whereby companion groups may be disposed in registration, letters on the flange to indicate the kind of condiments in each compartment, a knob secured to the second mentioned disk and cooperating with the letters to indicate when companion groups or openings are arranged in registration, said first mentioned disk being provided with indentations, and means depending from the second mentioned disk and receivable in the indentations to hold the second mentioned disk against casual movement and with companion groups of openings in registration.

FREDERIC J. HOYER.